3,687,683
METHOD FOR PRODUCING ENHANCED SOLUBLE COFFEE
Joel R. Kaplan, Ossining, and Arno Huste, Rego Park, N.Y., assignors to General Foods Corporation, White Plains, N.Y.
No Drawing. Filed June 15, 1970, Ser. No. 46,447
Int. Cl. A23f 1/08
U.S. Cl. 99—71                                      9 Claims

ABSTRACT OF THE DISCLOSURE

A method for producing an enhanced soluble coffee product has been developed wherein a minor portion of enhanced, soluble food powder, such as coffee is agglomerated with a major portion of ground, unenhanced, soluble food powder such as spray-dried coffee.

BACKGROUND OF THE INVENTION

It is known in the art to produce an enhanced soluble coffee product by adding volatile enhancing materials to a concentrated, coffee percolate and then spray-drying the enhanced percolate. The spray-dried products prepared according to these known processes have been able to produce instant coffee beverages having improved taste and flavor, approaching the quality of beverages prepared using roasted and ground coffee.

These spray-dried coffees do not, however, have the granulated appearance of roasted and ground coffee; but rather, have the appearance of a powder. It has been previously found that spray-dried coffee powder which has been subjected to an agglomeration step in order to obtain a larger particle size and a darker particle color exhibit an appearance simulating that of roasted and ground coffee and are preferred by the consumer.

It has been the practice in the art to produce soluble coffee agglomerates by grinding regular spray-dried coffee to particle sizes to less than 100 microns and to subsequently agglomerate this ground powder. It has been suggested in the prior art that in order to produce acceptable agglomerates, that is agglomerates which will not break down during packaging and storage, a fine grind size for the feed powder into the agglomerator is required. This fine powder is usually obtained by grinding the spray-dried coffee in a commercial hammer or other impact-type milling machine.

It has been found that attempts to produce enhanced coffee agglomerates in this manner have not proven successful due to the degradation of the enhancer to an unacceptably low level. The problem appears to be that the grinding of an enhanced spray-dried coffee will cause any volatile enhancer entrapped or fixed within the spray-dried particles to disappear during the grinding operation.

It is sought by this invention to produce an enhanced soluble coffee product which is agglomerated to give the appearance of roasted and ground coffee and will still possess a high quality flavor and taste.

SUMMARY OF THE INVENTION

According to this invention a minor portion of enhanced, soluble coffee powder is agglomerated with a major portion of finely-ground, unenhanced soluble coffee powder. In this manner the enhanced coffee fraction is not subjected to a rigorous grinding operation and is thus able to retain the encapsulated volatile enhancing material.

The enhanced soluble coffee may be produced by drying, under appropriate conditions, a coffee percolate which has been enhanced with a relatively high level of natural and/or synthetic coffee enhancers. This enhanced coffee powder may then be blended and agglomerated with a conventional, ground, spray-dried coffee powder. The agglomeration conditions suitable for use in this invention will be readily ascertainable by those skilled in the art.

It is also apparent that the method steps of this invention could be used fo produce enhanced agglomerates of other food materials such as decaffeinated coffee, tea and the like.

It is a object of this invention to produce an enhanced soluble coffee product.

It is a further object of this invention to produce an enhanced soluble coffee product having the appearance of roasted, ground coffee.

DESCRIPTION OF THE INVENTION

The method of this invention contemplates the use of an agglomeration step wherein a minor fraction of enchanced, soluble coffee powder is agglomerated with a major portion of ground, spray-dried coffee powder. It is contemplated that in practice the enhanced powder will usually comprise less than about 25% and preferably about 5% to 20% of the material fed to the agglomerator. However, successful products may be obtained with higher proportions of enhanced powder.

It is also contemplated by this invention that the feed material to the agglomerator may contain other powdered materials in addition to coffee, such as sugar, lightening solids and the like. These added powders may possess either fine or course particle size and may be present in any amount which will not prevent the production of either a structurally stable agglomerate or a commercially acceptable coffee product.

The method of this invention permits the production of an agglomerated product which has good physical appearance and which retains its enhanced flavor and taste.

The enhanced coffee powder suitable for use in this invention is prepared by adding a relatively high level of natural and/or synthetic volatile coffee enhancers to a liquid coffee percolate and drying the enhanced percolate such as by spray-drying, freeze-drying and the like. A preferred method for obtaining the enhanced coffee fraction is described in commonly assigned U.S. application, Ser. No. 20,949, filed Mar. 19, 1970. According to this preferred pocedure a concentrated coffee percolate, containing between 31% and 40% solids and containing aromatic volatile enhancers, is spray-dried at an air inlet temperature of between 300° F. and 550° F. and an air outlet temperature between 190° F. and 230° F. This spray-dried coffee powder is maintained in an unground condition.

The high level of enhancer is necessary in order to permit the use of only a small portion of the enhanced powder in the final product and also to allow for losses that may occur during the drying operation. The enhanced coffee percolate is normally dried in conventionally spray-drying equipment, however, it is also possible to obtain an enhanced coffee powder by other means, such as by a freeze drying operation.

If the enhanced percolate is freeze-dried, it will be necessary to comminute the freeze-dried material to powdered form. This can be done without significant loss of enhancer material if a coarsely ground powder is produced.

The enhancer materials may be any of those compositions possessing aromatic volatiles which impart an improved taste, aroma or flavor to a coffee product or beverage. Typical of the natural enhancers are the steam-distilled volatile aromas defined by U.S. Pats. Nos. 2,562,206 to Nutting and 3,132,947 to Mahlmann, and the vacuum-distilled volatile aromas described in U.S. Pats. Nos. 2,680,687 to Lemonnier and 3,035,922 to Mook et al. Synthetic enhancers such as the mercaptans, diacetyls or other volatile compounds, such as those enumerated in U.S. Pat. No. 1,696,419 may also be used in this invention. These and other materials which are known to be useful as flavor or aroma enhancers may be used in this invention either alone or in combination with other natural or synthetic enhancers.

The ground soluble coffee fraction for use in this invention may be prepared by means of any of the well-known spray-drying procedures heretofore employed in the production of the soluble coffee. Such spray-drying procedures normally yield soluble coffee particles having a particle size between 100 and 500 microns. This spray-dried powder is then ground through a commercial hammer mill in order to reduce the particle size of the coffee powder to a fine grind wherein essentially all the particles are less than 100 microns and preferably between about 5 and 50 microns.

According to this invention the feed material to the agglomerator may contain up to 50% by weight of the enhanced powder, however, normally a much lower weight fraction of this powder will be used. The agglomeration procedure used in the method of this invention may be any of the well-known agglomeration techniques such as that described in U.S. Pat. No. 2,977,203 to Sienkiewicz et al.

This invention is further described but not limited by the following examples.

Example I

A highly enhanced coffee percolate is prepared by adding to a concentrated (34% solids) percolate, which has been cooled to about 50° F., a volatile aromatic steam-distilled enhancer (prepared in accordance with the aforementioned Mahlmann Pat. No. 3,132,947) at a level of 0.216 ml. of enhancer for each 3.2 grams of coffee solids. This enhanced percolate is then spray dried at a spray nozzle pressure of 1200 p.s.i.g. and with a drier air inlet temperature of 385° F. and an air outlet temperature of 210° F. The enhanced coffee powder obtained has a particle size distribution between 100 and 300 microns and a moisture content of about 3%.

A liquid coffee percolate containing 25% solids was spray-dried in a conventional manner to produce a soluble coffee powder having a particle size distribution between 100 and 500 microns and a moisture content of 2.7%. This powder was ground in a hammer mill (Fitzpatrick Model D/6, but equipped with a 4 mesh U.S. standard sieve screen). This grinding produced a particle size distribution wherein 95% by weight of the particles are between 2 and 50 microns and 50% of the particles are less than about 20 microns.

A homogenous blend containing 15% of the unground enhanced material and 85% of the ground spray-dried coffee material is produced in a V-blender and this blend was agglomerated according to the process and apparatus of the aforementioned U.S. Pat. No. 2,977,203.

The coffee product produced according to this procedure has the dark color and the granular particle size normally associated with agglomerated coffee products, and the coffee product cups to a beverage having excellent flavor and taste.

Example II

An enhanced spray dried coffee powder was prepared in the manner according to Example I with the substitution of a synthetic enhancer, methylmercaptan, in place of the steam-distilled enhancer.

A mixture comprising 39.5% of conventional spray dried coffee, as in Example I, and 60.5% of commercially available, spray-dried, coffee lightening solids is co-ground in a hammer mill to a point where substantially all the particles were reduced to below 100 microns in size.

A homogenous blend containing 9% of the unground enhanced coffee and 91% of the co-ground mixture is agglomerated according to the process and apparatus of Pat. No. 2,977,203.

The prelightened coffee agglomerate prepared according to this example exhibits a pleasing appearance and cups to a lightened coffee beverage having enhanced flavor.

It will be apparent that there are variations and modifications of this invention, and that the examples, ingredients and typical operating procedures may be varied without departing from the spirit of the invention.

Having thus described the invention what is claimed is:

1. A method for producing an enhanced, agglomerated food product comprising the steps of:
    (a) separately forming an enhanced food powder and a spray-dried, unenhanced food powder, said powder having a particle size greater than 100 microns;
    (b) grinding the unenhanced powder to a particle size wherein essentially all the particles are between 5 and 50 microns;
    (c) blending a major portion of the ground powder with a minor portion of the unground enhanced powder; and
    (d) agglomerating the blended powders.

2. The method according to claim 1 wherein the minor portion of enhanced powder is less than about 25% by weight of the blend.

3. The method according to claim 2 wherein the minor portion is from 5% to 20%.

4. The method according to claim 1 wherein the enhanced food powder comprises an unground, spray-dried, enhanced coffee powder.

5. A method of producing an enhanced, agglomerated, soluble coffee product comprising the steps of:
    (a) separately forming a soluble, enhanced coffee powder and a spray-dried, unenhanced coffee powder, said powders having a particle size greater than 100 microns;
    (b) grinding the unenhanced coffee powder to a particle size wherein essentially all the particles are between 5 and 50 microns;
    (c) blending a major portion of the ground coffee powder with a minor portion of the unground enhanced coffee powder; and
    (d) agglomerating the blended coffee powders.

6. The method according to claim 5 wherein the minor portion of enhanced coffee powder is less than about 25% by weight of the blend.

7. The method according to claim 6 wherein the minor portion is from 5% to 20%.

8. The method according to claim 7 wherein the soluble, enhanced powder comprises a unground, spray-dried coffee.

9. The method according to claim 8 wherein the spray-dried, enhanced powder is obtained by spray-drying a concentrated, enhanced coffee percolate.

References Cited
UNITED STATES PATENTS

| | | | |
|---|---|---|---|
| 3,485,637 | 12/1969 | Adler et al. | 99—71 |
| 3,493,388 | 2/1970 | Hair | 99—71 |

FRANK W. LUTTER, Primary Examiner

W. L. MENTLIK, Assistant Examiner

U.S. Cl. X.R.

99—DIG. 4